United States Patent
Tsuchiya

(10) Patent No.: US 10,116,822 B2
(45) Date of Patent: Oct. 30, 2018

(54) OPTICAL SCANNING DEVICE AND IMAGE FORMING APPARATUS INCLUDING THE SAME

(71) Applicant: KYOCERA Document Solutions Inc., Osaka (JP)

(72) Inventor: Hiroaki Tsuchiya, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/684,096

(22) Filed: Aug. 23, 2017

(65) Prior Publication Data

US 2018/0063351 A1   Mar. 1, 2018

(30) Foreign Application Priority Data

Aug. 29, 2016  (JP) .................................. 2016-167278

(51) Int. Cl.
| | |
|---|---|
| *B41J 29/17* | (2006.01) |
| *H04N 1/00* | (2006.01) |
| *B41J 29/13* | (2006.01) |
| *B41J 29/02* | (2006.01) |
| *B41J 29/38* | (2006.01) |
| *B41J 2/47* | (2006.01) |

(Continued)

(52) U.S. Cl.
CPC .......... *H04N 1/00909* (2013.01); *B41J 29/02* (2013.01); *B41J 29/13* (2013.01); *B41J 29/17* (2013.01); *B41J 29/38* (2013.01); *G03G 21/169* (2013.01); *B41J 2/473* (2013.01); *G03G 15/0435* (2013.01); *G03G 21/168* (2013.01); *G03G 21/1671* (2013.01); *G03G 2215/0404* (2013.01)

(58) Field of Classification Search
CPC ....... H04N 1/00909; B41J 29/17; B41J 29/38; B41J 29/02; B41J 29/13; B41J 2/473; G03G 21/169; G03G 15/0435; G03G 21/1671; G03G 21/168; G03G 2215/0404
See application file for complete search history.

(56) References Cited

U.S. PATENT DOCUMENTS

2009/0148173 A1* 6/2009 Tajima ............... G03G 15/0258
                                                                       399/36

FOREIGN PATENT DOCUMENTS

JP    2015-199278    * 11/2015  ................ B41J 2/47

\* cited by examiner

*Primary Examiner* — Yaovi M Ameh
(74) *Attorney, Agent, or Firm* — Wenderoth, Lind & Ponack, L.L.P.

(57) ABSTRACT

An optical scanning device includes a housing, a transparent cover, a cleaning member, a holding member, and a movement mechanism. The cleaning member slidably contacts with the surface of the transparent cover to clean the surface. The holding member holds the cleaning member. The movement mechanism allows the holding member to reciprocally move along the transparent cover in the aforementioned predetermined direction. The aforementioned holding member has an inside/outside double structure including an inner boss member and an outer boss member. The inner boss member receives power from the movement mechanism. The outer boss member internally receives the inner boss member. The outer boss member is longer than the inner boss member. The outer boss member reaches a moving end and stops earlier than the inner boss member, and the aforementioned inner boss member moves in the outer boss member reaches the moving end and stops.

5 Claims, 22 Drawing Sheets

(51) Int. Cl.
*G03G 15/043* (2006.01)
*G03G 21/16* (2006.01)

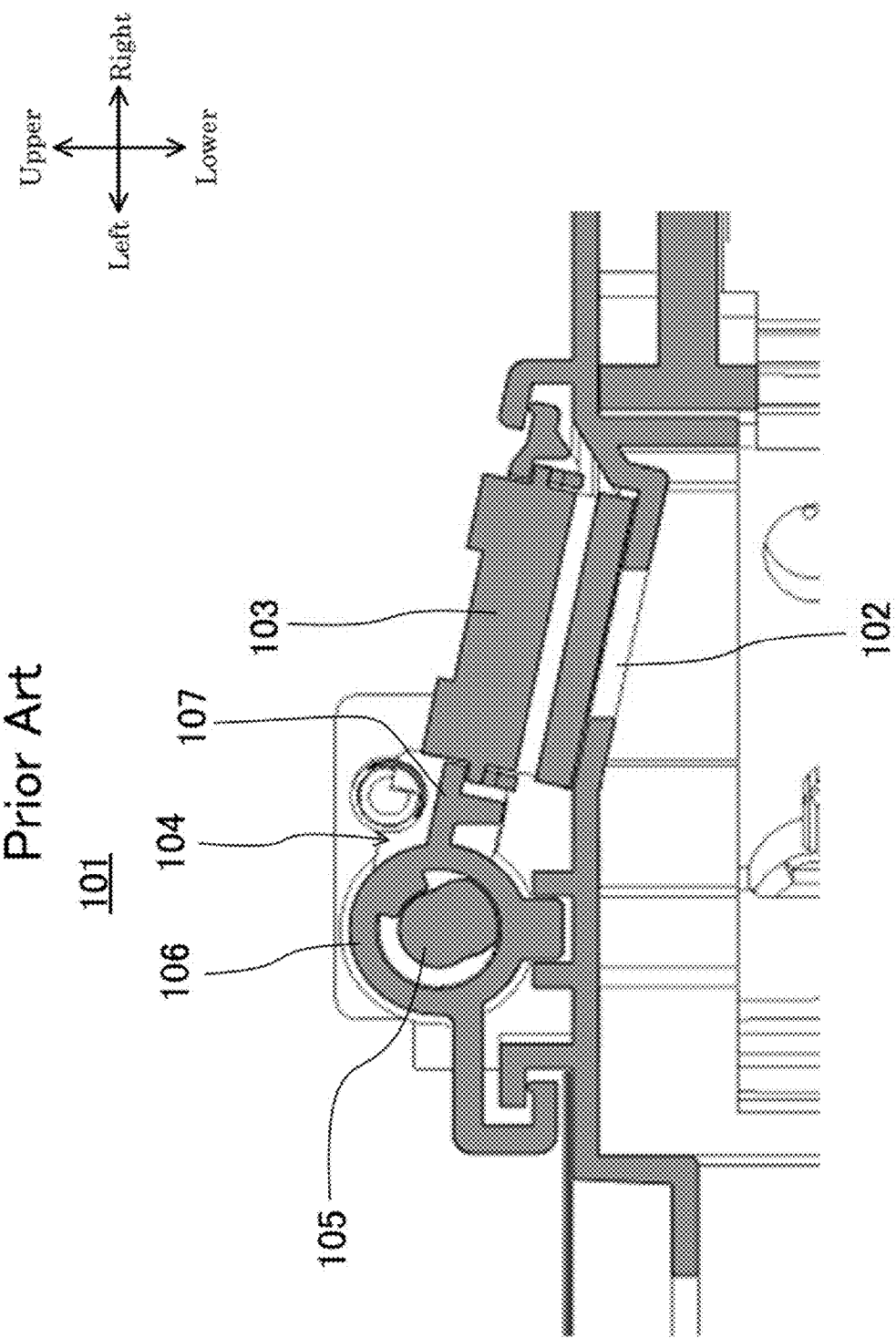

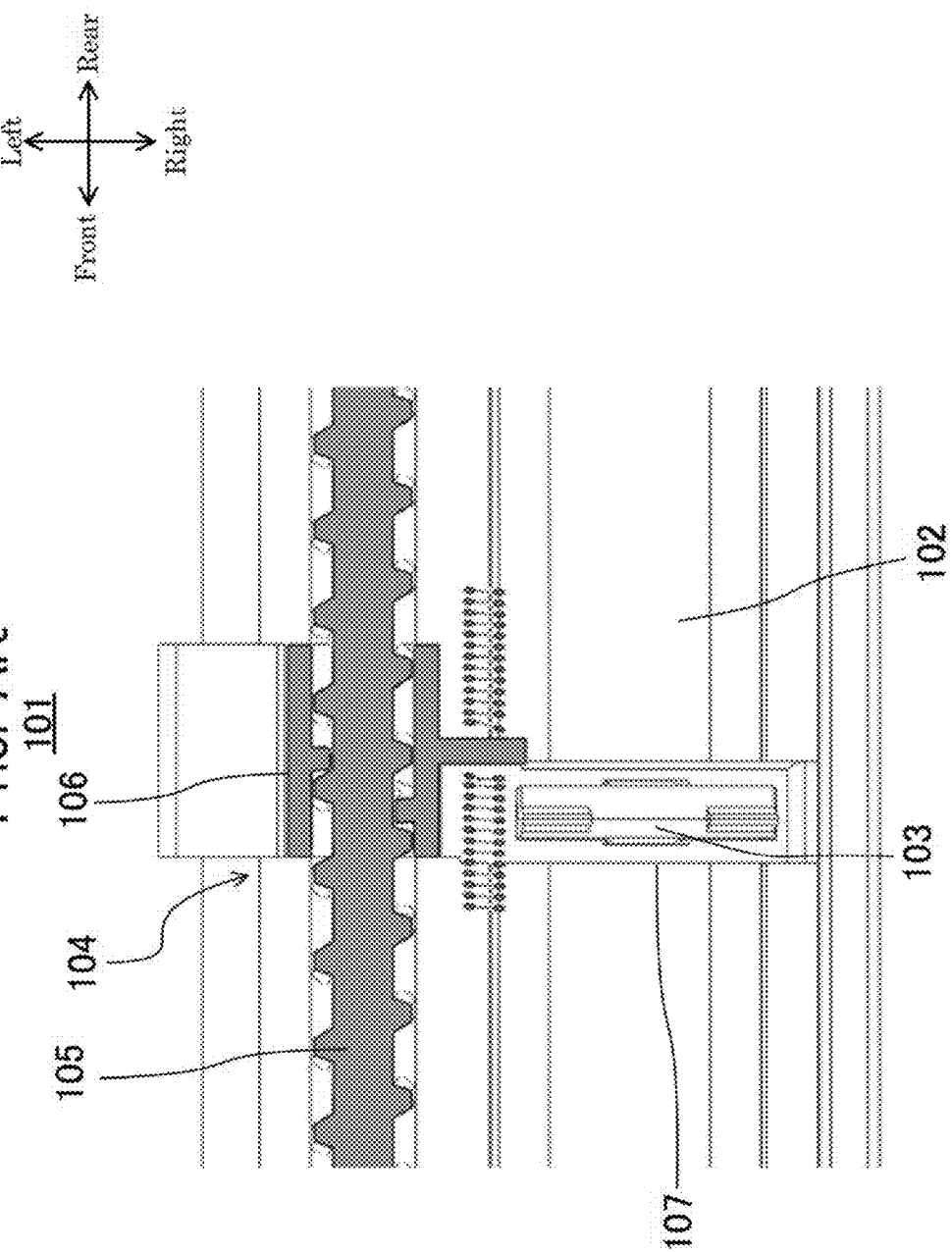

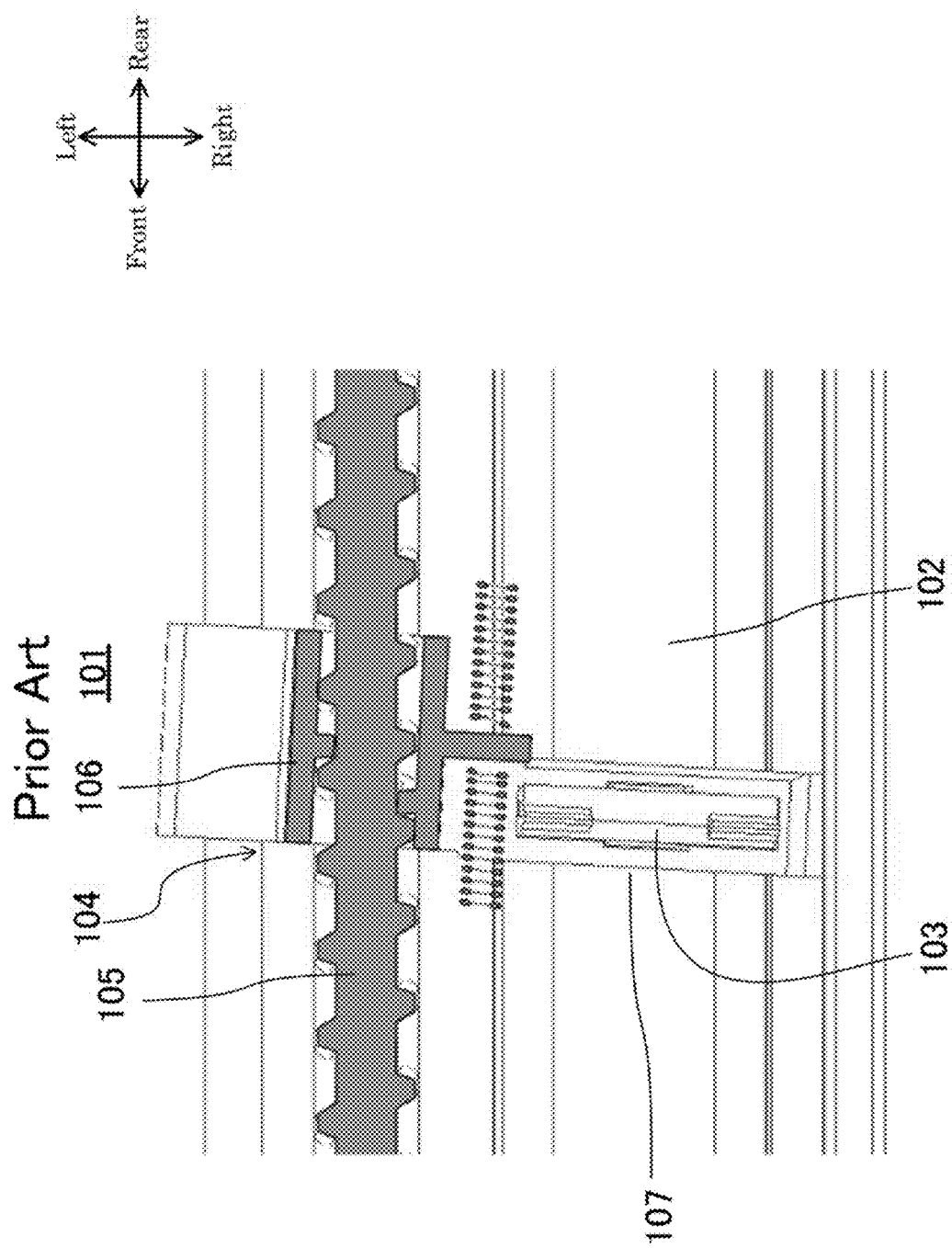

OPTICAL SCANNING DEVICE AND IMAGE FORMING APPARATUS INCLUDING THE SAME

CROSS-REFERENCE TO RELATED APPLICATION

This application is based upon and claims the benefit of priority from Japanese Patent Application No. 2016-167278 filed on Aug. 29, 2016, the entire contents of which are incorporated herein by reference.

BACKGROUND

The technology of the present disclosure relates to an optical scanning device and an image forming apparatus including the same.

In the related art, an image forming apparatus employing an electrophotographic system, such as a copy machine and a printer, includes an optical scanning device that emits light for forming an electrostatic latent image on a photosensitive drum, and a developing device for developing the electrostatic latent image formed on the photosensitive drum as a toner image.

The optical scanning device has a housing that receives a polygon mirror, an image forming lens and the like. The housing is formed with light emitting ports from which light is emitted. The light emitting port includes an opening extending in a predetermined direction. The light emitting port is closed by a transparent cover.

When dirt, dust and the like due to toner and the like are attached to the surface of the transparent cover, there is a problem that the optical characteristics of the optical scanning device are deteriorated and thus image failure occurs. In this regard, there has been proposed a cleaning mechanism 101 as illustrated in FIG. 20 to FIG. 22. The cleaning mechanism 101 has a cleaning member 103 for cleaning a transparent cover 102, a holding member 104 for holding the cleaning member 103, and a screw shaft 105 for fitting and supporting the holding member 104.

The holding member 104 is configured to reciprocally move along the screw shaft 105 when the screw shaft 105 is rotated forward and backward by a motor. In this way, the cleaning member 103 reciprocally moves while abutting the surface of the transparent cover 102, so that the surface of the transparent cover is cleaned by the cleaning member 103.

SUMMARY

An optical scanning device according to one aspect of the present disclosure includes a housing, a transparent cover, a cleaning member, a holding member, and a movement mechanism. The housing has light emitting ports extending in a predetermined direction. The transparent cover closes the light emitting ports. The cleaning member slidably contacts with the surface of the transparent cover to clean the surface. The holding member holds the cleaning member. The movement mechanism allows the holding member to reciprocally move along the transparent cover in the aforementioned predetermined direction.

The aforementioned holding member has a double structure including an inner boss member and an outer boss member. The inner boss member receives power from the movement mechanism. The outer boss member internally receives the inner boss member. The outer boss member is longer than the inner boss member. The outer boss member reaches a moving end and stops earlier than the inner boss member, and the aforementioned inner boss member moves in the outer boss member, reaches the moving end and stops.

BRIEF DESCRIPTION OF THE DRAWINGS

FIG. 6 is viewed from an oblique right side.

FIG. 8 is viewed from an oblique lower side.

FIG. 21 is a view corresponding to FIG. 4, which illustrates a related art.

FIG. 22 is a view corresponding to FIG. 17, which illustrates a related art.

FIG. 23 is a view corresponding to FIG. 22, which illustrates a state in which a holding member is inclined in a related art.

DETAILED DESCRIPTION

Hereinafter, an example of an embodiment will be described in detail on the basis of the drawings. It is noted that the technology of the present disclosure is not limited to the following embodiments.

Embodiment

Figure 1:
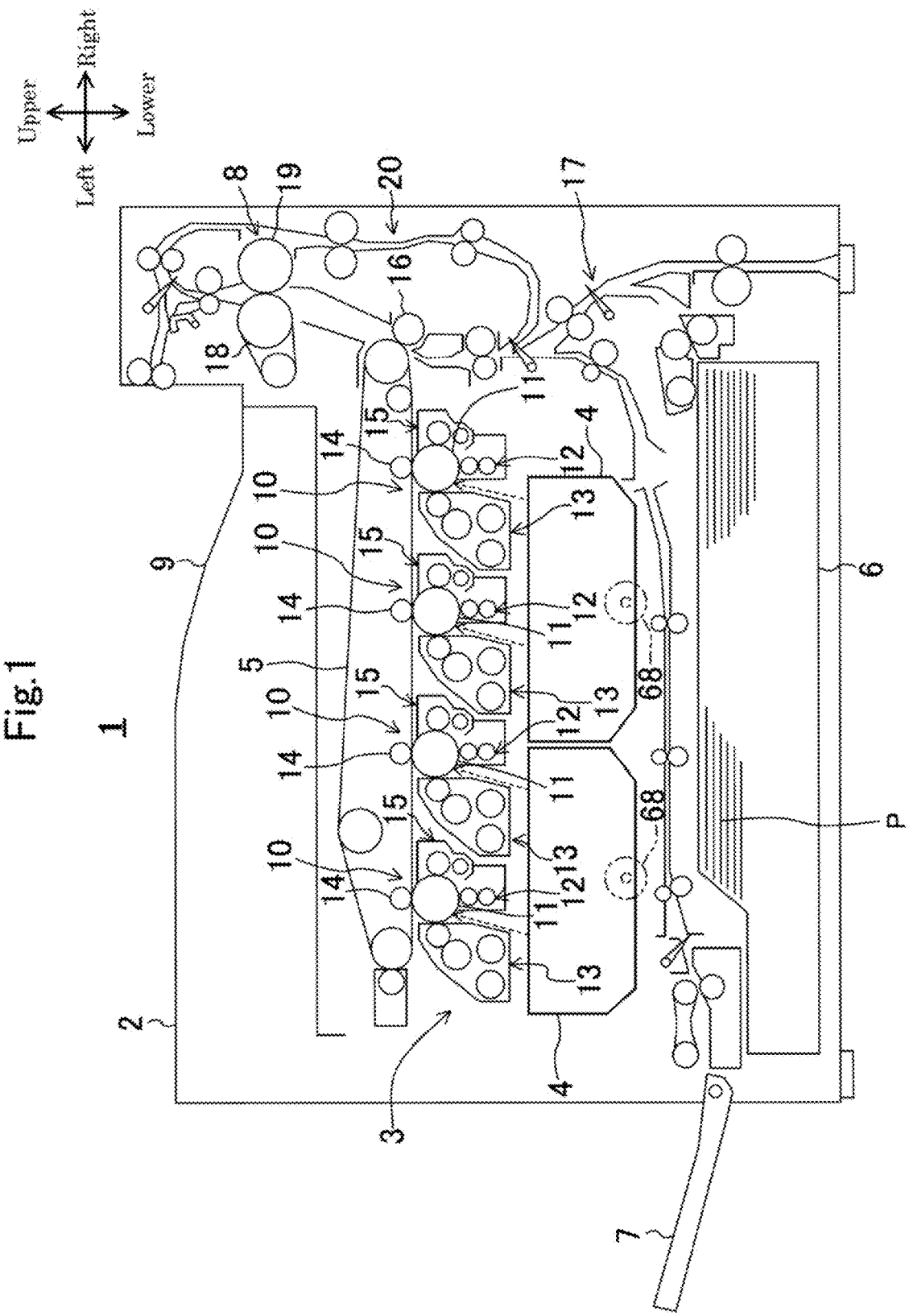
FIG. 1 is an overall view illustrating a schematic configuration of an image forming apparatus in an embodiment.

FIG. 1 illustrates a schematic configuration diagram of an image forming apparatus 1 according to an example of an embodiment. In the following description, it is assumed that a front side and a rear side indicate a front side and a rear side (a front side and a back side in a direction vertical to the sheet surface of FIG. 1) of the image forming apparatus 1, and a left side and a right side indicate a left side and a right side when the image forming apparatus 1 is viewed from the front side.

The image forming apparatus 1 is a tandem type color printer and has an image forming apparatus body 2 covered by a box-like casing. The image forming apparatus body 2 is provided therein with an image forming unit 3. The image forming unit 3 transfers an image to a recording sheet P and forms the image on the recording sheet P on the basis of image data transmitted from an external device such as a computer subjected to network connection and the like. Below the image forming unit 3, two optical scanning devices 4 are arranged to emit laser lights, and above the image forming unit 3, a transfer belt 5 is arranged. Below the two optical scanning devices 4, a sheet storage unit 6 is arranged to store the recording sheet P, and at the left side of the sheet storage unit 6, a manual sheet feeding unit 7 is arranged. At a right upper side of the transfer belt 5, a fixing unit 8 is arranged to perform a fixing process on the image transferred to and formed on the recording sheet P. A reference numeral 9 indicates a sheet discharge unit arranged at an upper portion of the image forming apparatus body 2 to discharge the recording sheet P subjected to the fixing process in the fixing unit 8.

The image forming unit 3 includes four image forming units 10 arranged in a row along the transfer belt 5. Each of the image forming units 10 has a photosensitive drum 11. Directly under each photosensitive drum 11, a charging device is arranged, and at the left side of each photosensitive drum 11, a developing device 13 is arranged. Directly above each photosensitive drum 11, a primary transfer roller 14 is arranged, and at the right side of each photosensitive drum 11, a cleaning unit 15 is arranged to clean the peripheral surface of the photosensitive drum 11.

The peripheral surface of each photosensitive drum 11 is uniformly charged by the charging device 12, and laser lights based on predetermined image data are irradiated to the charged peripheral surface of each photosensitive drum 11 from the two optical scanning devices 4, so that an electrostatic latent image is formed on the peripheral surface of each photosensitive drum 11. A developer is supplied to the electrostatic latent image from the developing device 13, so that a toner image of yellow, magenta, cyan, or black is formed on the peripheral surface of each photosensitive drum 11. These toner images are respectively superposed on and transferred to the transfer belt 5 by a transfer bias applied to the primary transfer roller 14.

A reference numeral 16 indicates a secondary transfer roller arranged below the fixing unit 8 in the state of abutting the transfer belt 5, wherein the recording sheet P conveyed along a sheet conveyance path 17 from the sheet storage unit 6 or the manual sheet feeding unit 7 is interposed between the secondary transfer roller 16 and the transfer belt 5, and the toner images on the transfer belt 5 are transferred to the recording sheet P by a transfer bias applied to the secondary transfer roller 16.

The fixing unit 8 includes a heating roller 18 and a pressure roller 19, wherein the recording sheet P is interposed by the heating roller 18 and the pressure roller 19 so as to be pressed and heated, so that the toner images, which have been transferred to the recording sheet P, are fixed to the recording sheet P. The recording sheet P subjected to the fixing process is discharged to the sheet discharge unit 9. A reference numeral 20 indicates a reversing conveyance path for reversing the recording sheet P discharged from the fixing unit 8 at the time of duplex printing.

—Details of Optical Scanning Device—

The two optical scanning devices 4 are arranged in a row in the right and left direction. The left optical scanning device 4 is configured to emit a laser light corresponding to magenta (M) and cyan (C), and the right optical scanning device 4 is configured to emit a laser light corresponding to yellow (Y) and black (K). Since the configurations of the two optical scanning devices 4 are equal to each other, only the configuration of the right optical scanning device 4 will be described below and the description of the left optical scanning device 4 will be omitted.

Figure 2:
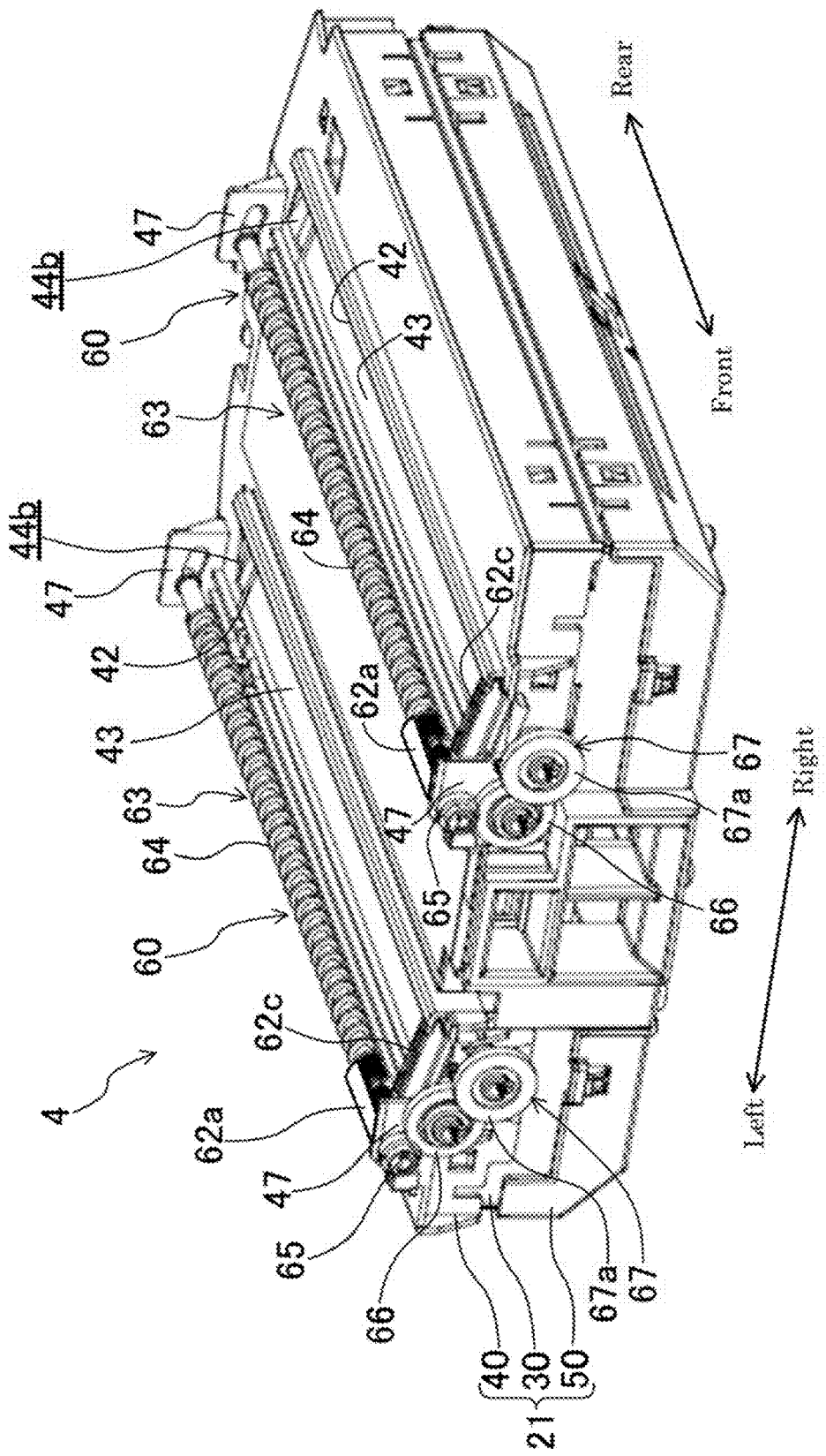
FIG. 2 is a perspective view when an optical scanning device is viewed from a front oblique right side.
Figure 3:
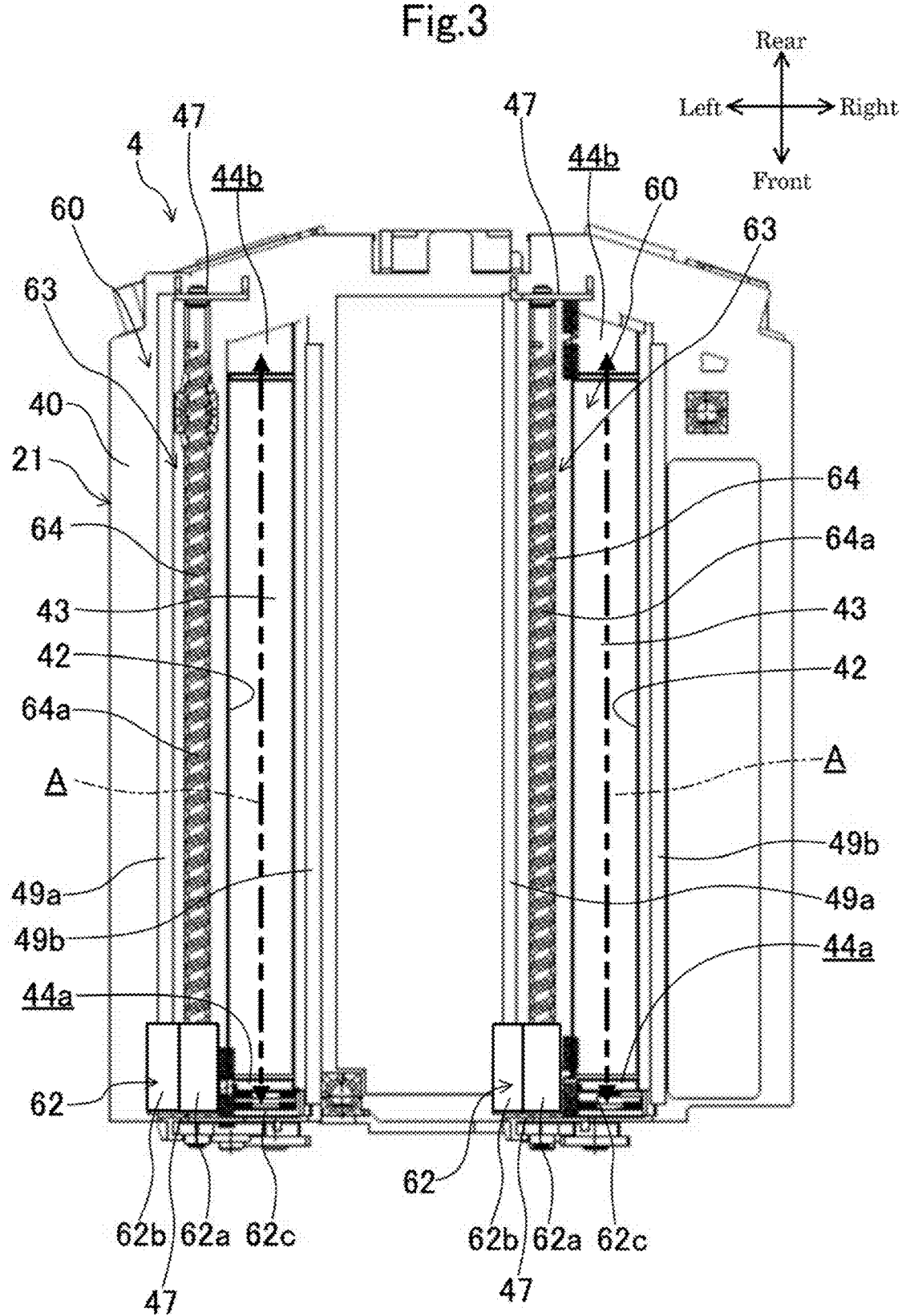
FIG. 3 is a plan view when an optical scanning device is viewed from an upper side.
Figure 4:
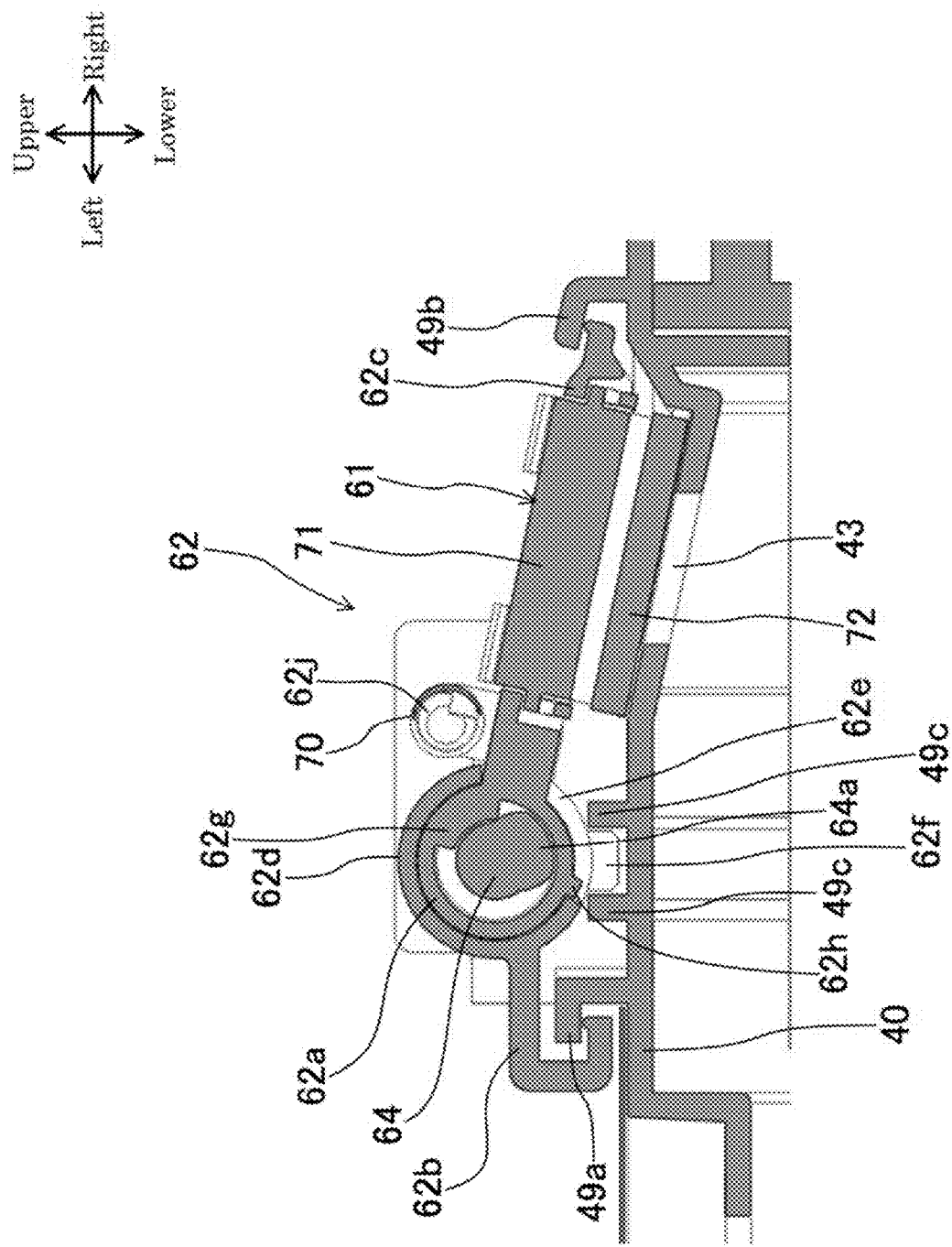
FIG. 4 is a schematic view when a holding member is viewed from an axial direction of a screw shaft.

As illustrated in FIG. 2 and FIG. 3, the optical scanning device 4 includes a resinous housing 21. The housing 21 has a flat sealed box shape. The housing 21 is configured with a bottomed box-like housing body 30 opened upward, an upper lid that covers an upper side of the housing body 30, and a lower lid 50 that covers a lower side of the housing body 30. The upper lid 40 is formed with a pair of light emitting ports arranged in the right and left direction. Each light emitting port 42 has a rectangular shape extending in the front and rear direction (a predetermined direction) and is closed by a glass cover 43 serving as a transparent cover. At places of the upper lid 40, which are adjacent to a front side and a rear side of each glass cover 43, a front concave part 44a and a rear concave part 44b are formed to allow foreign matters to be collected by a cleaning member 61, which will be described later, to fall down. Both the front concave part 44a and the rear concave part 44b are opened upward.

Although not illustrated in the drawings, the housing body 30 is provided therein with a light source that generates a pair of laser lights corresponding to yellow (Y) and black (K) (or magenta (M) and cyan (C)), a polygon mirror for deflecting the laser lights, and an optical element group that forms images of the deflected laser lights on the surfaces of the photosensitive drums 11. The pair of laser lights emitted from the light source are scanned by the polygon mirror in the main scanning direction, the images of the laser lights are formed by the optical element group, and then are emitted toward the photosensitive drums 11 corresponding to each color from the light emitting ports 42 formed in the upper lid 40.

The upper lid 40 is provided on the upper surface thereof with a pair of cleaning mechanisms 60 for automatically cleaning the glass covers 43. Each cleaning mechanism 60 has a cleaning member 61 that slidably contacts with the surface of the glass cover 43 to clean the surface, and a holding member 62 that holds the cleaning member 61, and a movement mechanism that allows the holding member 62 to reciprocally move along the glass cover 43 in the front and rear direction. The movement mechanism 63 has a screw shaft 64 extending along the glass cover 43 in the front and rear direction. Both ends of the screw shaft 64 are supported to bearing plates 47. On the outer peripheral surface of the screw shaft 64, a spiral screw thread 64a is continuously formed in the longitudinal direction, and the holding member 62 is fitted and supported to the screw shaft 64.

As illustrated in FIG. 4 to FIG. 8, the holding member 62 is made of resin and has an inside/outside double structure including a cylindrical inner boss member 62a externally fitted to the screw shaft 64 to directly receive power from the screw shaft 64, and an outer boss member 62d that internally receives the inner boss member 62a in a light press-fitting state. The inner boss member 62a has a length similar to that of the boss part 106 in the related art (see FIG. 20 to FIG. 23), but the outer boss member 62d is formed to have a long length twice or more as long as the inner boss member 62a.

Figure 10:
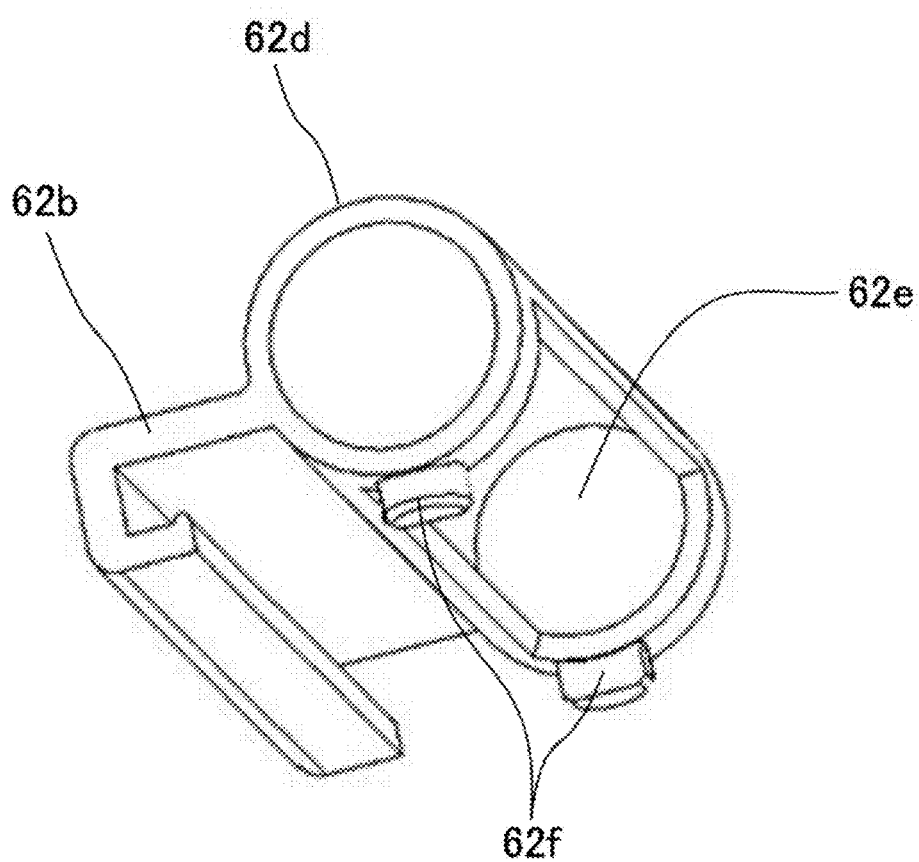
FIG. 10 is a perspective view of an inner boss member.

As illustrated in FIG. 10, in the outer boss member 62d, a left arm part 62b extends leftward from a left surface. A distal end portion of the left arm part 62b is engaged with a left side first rail part 49a having a sectional L shape and protruding from the upper surface of the upper lid 40. At the right of the left arm part 62b at the oblique lower side surface of the outer boss member 62d, a rectangular opening 62e is formed, and engagement protrusions 62f protrude from both front and rear ends of the opening 62e. The engagement protrusions 62f are engaged between two second rail parts 49c extending on the upper surface of the upper lid 40 in the front and rear direction at the right of the first rail part 49a.

Figure 11:
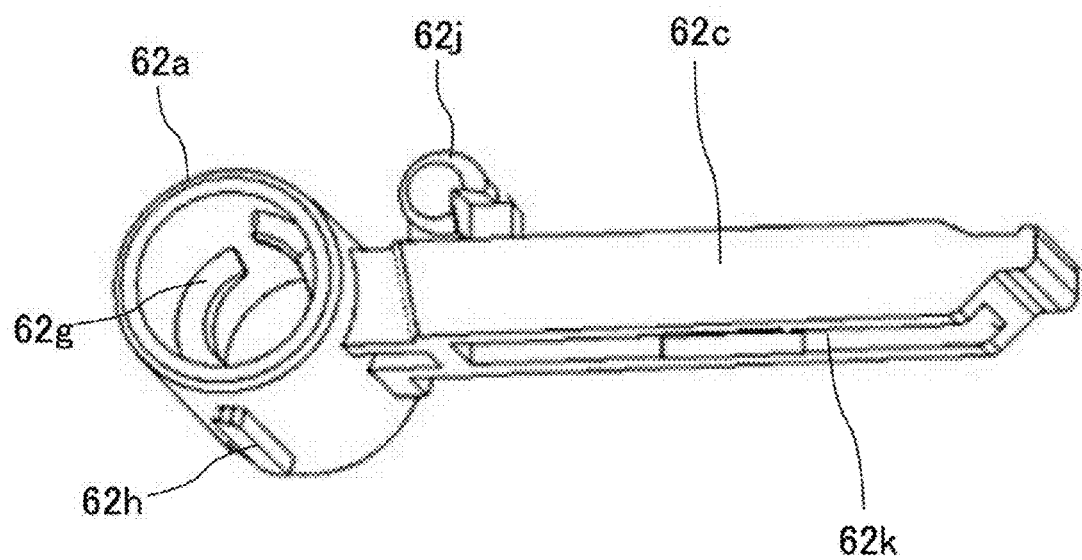
FIG. 11 is a perspective view of an outer boss member.

As illustrated in FIG. 11, in the inner boss member 62a, a right arm part 62c extends rightward from a right surface of the inner boss member 62a so as to be longer than the left arm part 62b. A distal end portion of the right arm part 62c is engaged with a right side third rail part 49b having a sectional L shape and protruding from the upper surface of the upper lid 40. In this way, the inner boss member 62a and the outer boss member 62d are integrally guided by the first rail part 49a, the second rail parts 49c, and the third rail part 49b so as to be movable in the front and rear direction.

The inner boss member 62a is formed on the inner peripheral surface thereof with a spiral screw thread 62g for about one circumference, and in a state in which the inner boss member 62a is externally fitted to the screw shaft 64, the screw thread 62g of the inner boss member 62a is screwed into the screw thread 64a of the screw shaft 64. From a lower outer peripheral surface of the inner boss member 62a, a positioning protrusion 62h protrudes, and in a state in which the inner boss member 62a is lightly press-fitted to the outer boss member 62d through the opening 62e, the positioning protrusion 62h abuts a lower edge of the opening 62e and a base end of the right arm part 62c abuts an upper edge of the opening 62e, so that the inner boss member 62a is prevented from being rotated with respect to the outer boss member 62d in the circumferential direction.

From an upper base end of the right arm part 62c, a spring mounting part 62j protrudes, and a spring 70 is mounted to the spring mounting part 62j so as to extend to both front and rear sides of the spring mounting part 62j. A part protruding to the front side of the spring mounting part 62j is defined as a front spring part 70a and a part protruding to the rear side of the spring mounting part 62j is defined as a rear spring part 70b.

Figure 9:
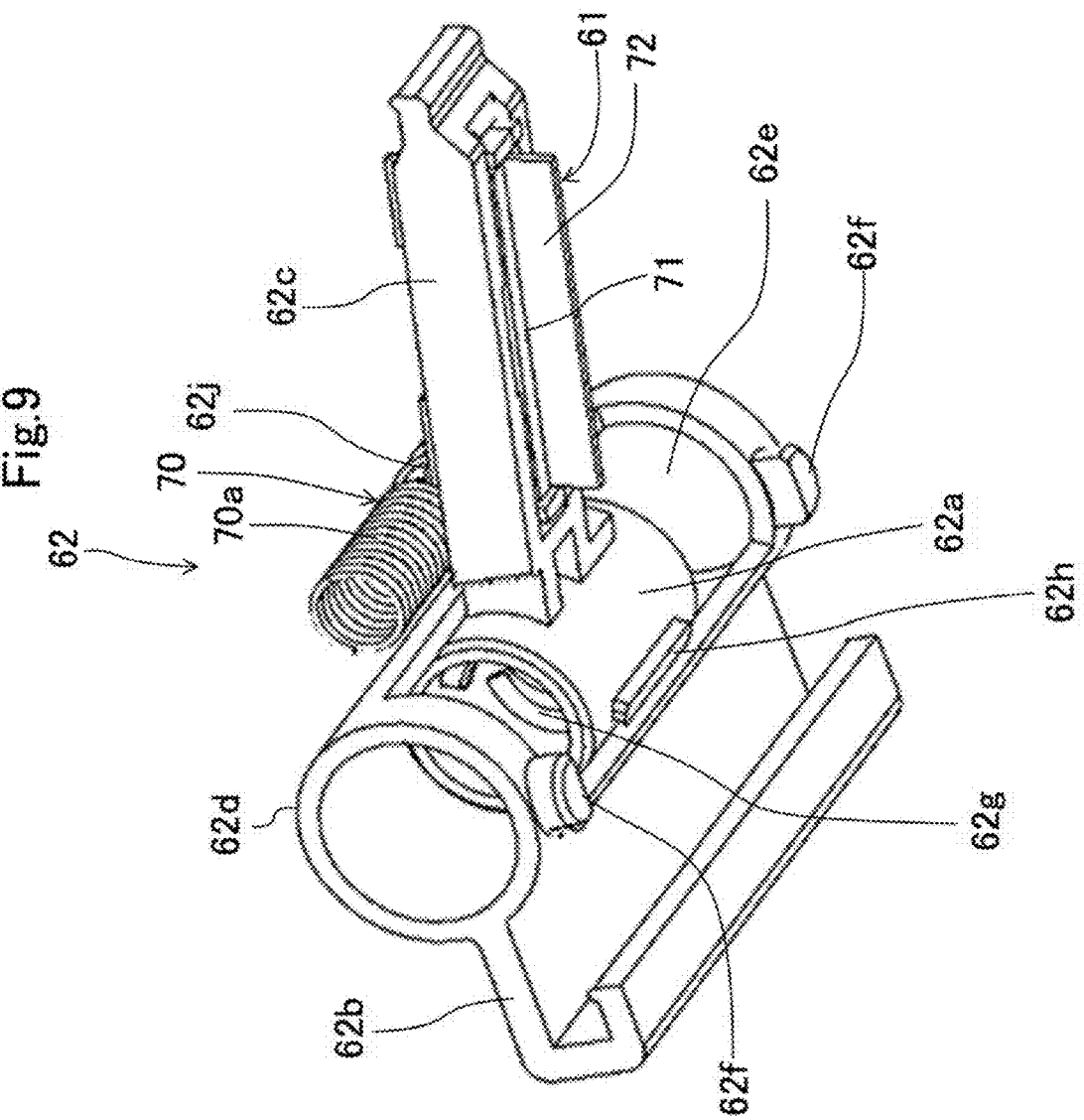
FIG. 9 is a perspective view when
Figure 12:
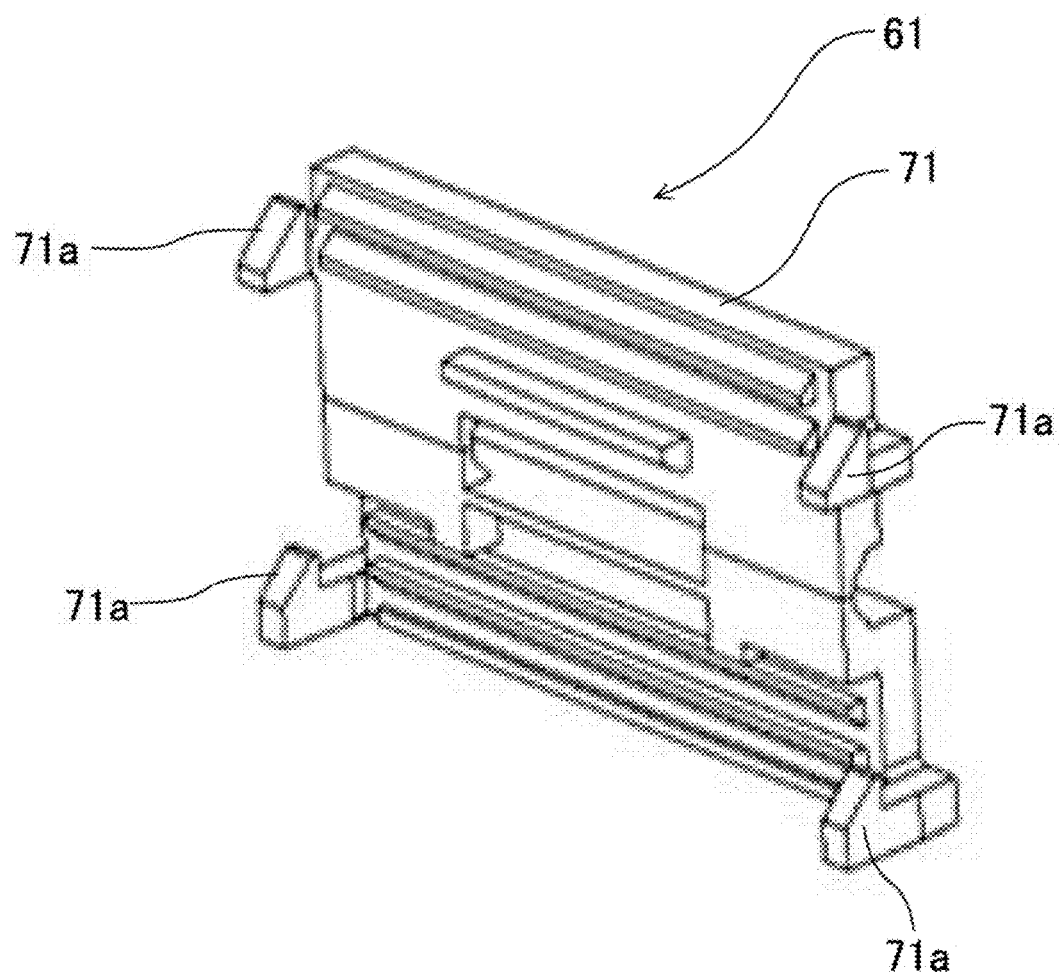
FIG. 12 is a perspective view of a plate-like holder of a cleaning member.
Figure 13:
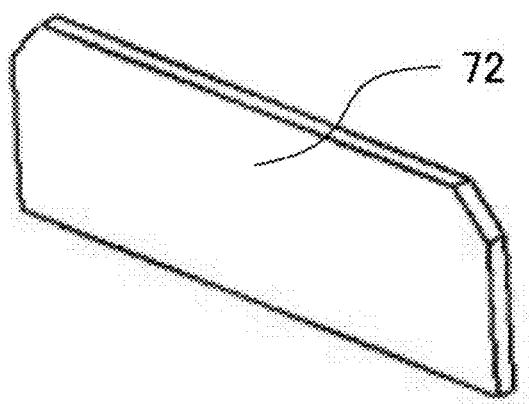
FIG. 13 is a perspective view of a blade of a cleaning member.
Figure 14:
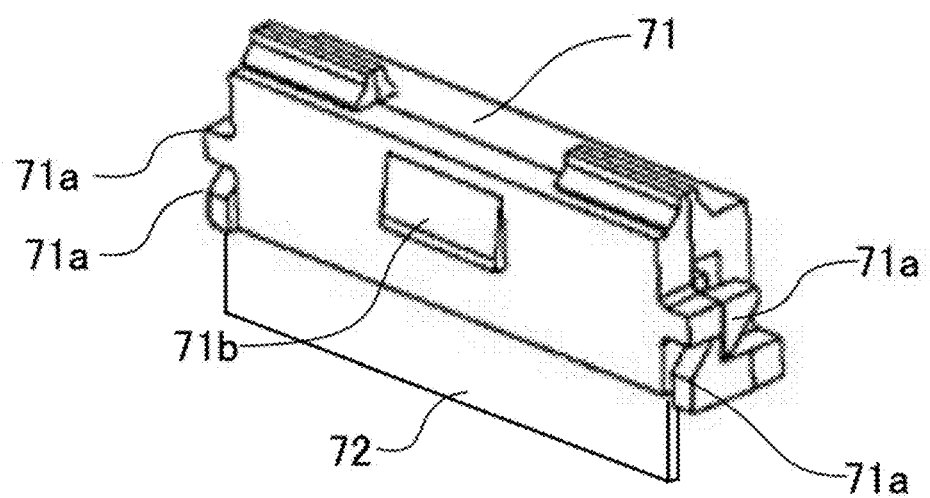
FIG. 14 is a perspective view of a cleaning member.

In the right arm part 62c, a rectangular mounting hole 62k for mounting the cleaning member 61 is formed to vertically pass through. The cleaning member 61 is configured by allowing a blade 72 (see FIG. 13), which includes an elastic member (e.g., a silicon pad) abutting the upper surface of the glass cover 43, to be inserted as illustrated in FIG. 14 in a two-folded resinous plate-like holder 71 having engagement pieces 71a at four corners as illustrated in FIG. 12, by allowing the engagement pieces 71a vertically adjacent to each other to be engaged with each other, and by assembling the blade 72 to the holder 71. In the cleaning member 61 configured as described above, a locking convex part 71b (see FIG. 14) formed on a side surface of the holder 71 is locked with a locking concave part (not illustrated) formed in an inner surface of the mounting hole 62k of the right arm part 62c, so that the cleaning member 61 is mounted to the right arm part 62c as illustrated in FIG. 9.

The movement mechanism 63 has a driven gear 65, an idle gear 66, and an input gear 67 in addition to the screw shaft (see FIG. 2). The driven gear 65 is fixed to a front end portion of the screw shaft 64 and is rotated together with the screw shaft 64. The idle gear 66 is meshed with the driven gear 65 from a right oblique lower side. The input gear 67 has a small diameter gear part (not illustrated) and a large diameter gear part 67a arranged coaxially with each other. The small diameter gear part of the input gear 67 is meshed with the idle gear 66 from a right oblique lower side. The idle gear 66 and the input gear 67 are respectively held to the front side surface of the upper lid 40 via shaft members so as to rotatable. The large diameter gear part 67a of the input gear 67 is meshed with a motor gear when the optical housing is set at a predetermined place of the image forming apparatus body 2 from an upper side. The motor gear is connected to a motor 68 (illustrated only in FIG. 1) provided in the image forming apparatus body 2 so as to be able to transmit power. The motor 68, for example, may also serve as a motor for driving a sheet conveyance mechanism in the image forming apparatus body 2.

When the cleaning mechanism 60 operates, the screw shaft is driven by the motor 68 in both forward and backward directions. As a consequence, the screw shaft 64 is rotated together with the driven gear 65, so that the holding member fitted and supported to the screw shaft 64 reciprocally moves in the front and rear direction. In this way, the blade of the cleaning member 61 held to the holding member 62 reciprocally moves in the front and rear direction while abutting the upper surface of the glass cover 43, so that the surface of the glass cover 43 is cleaned.

A reciprocal movement path A (see FIG. 3) of the cleaning member 61 is a linear movement path extending in the front and rear direction, and in the present embodiment, a rear moving end of the reciprocal movement path A serves as a waiting position. This waiting position is a position at which the cleaning member 61 having completed a reciprocal operation waits until a next reciprocal operation starts. The waiting position is positioned at an upper side of the rear concave part 44b formed in the upper surface of the upper lid 40. On the other hand, a front moving end (a moving end opposite to the waiting position) of the reciprocal movement path A is positioned at a lower side of the front concave part 44a formed in the upper surface of the upper lid 40. That is, the bearing plates 47, which the holding member 62 abuts by reciprocally moving, serve as the front moving end and the rear moving end. Foreign matters, which are collected on the glass covers 43 while the cleaning member 61 is moving to the front moving end from the waiting position (the rear moving end of the reciprocal movement path A) due to the operation of the cleaning mechanism 60, are fallen into the front concave part 44a. On the other hand, foreign matters, which are collected on the glass covers 43 while the cleaning member 61 is returning to the rear moving end after reaching the front moving end, are fallen into the rear concave part 44b. The fallen foreign matters are sucked into a cooling air passage side by negative pressure of airflow flowing through a cooling air passage (not illustrated).

Hereinafter, the operation for cleaning the glass cover 43 in the image forming apparatus 1 of the present embodiment will be described in detail with reference to FIG. 15 to FIG. 17.

Figure 15:
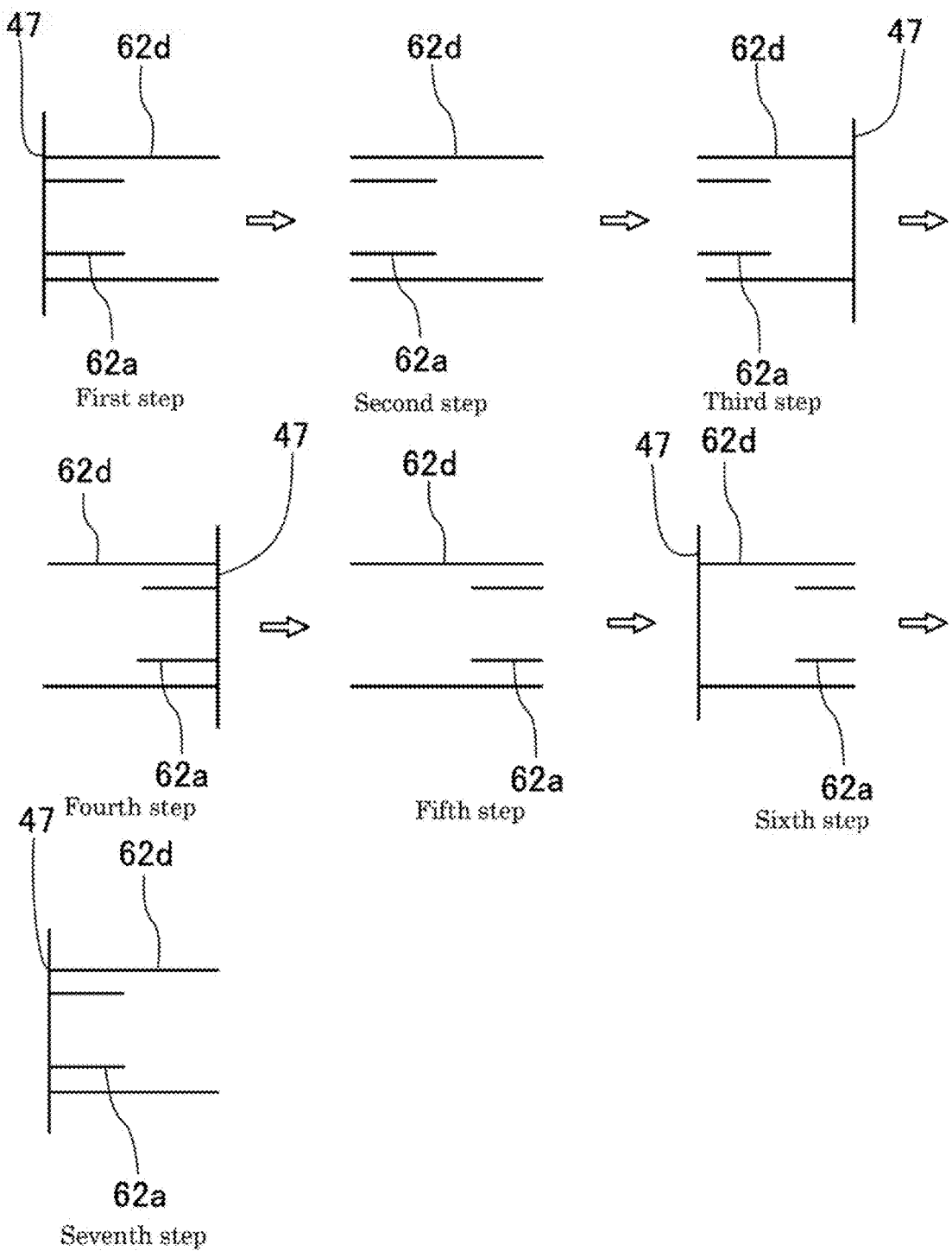
FIG. 15 is a flow diagram for explaining a cleaning operation of a cleaning member.

FIG. 15 illustrates a state in which both the inner boss member 62a and the outer boss member 62d abut the bearing plate 47, and the screw thread 62g of the inner boss member 62a is detached from the screw thread 64a of the screw shaft 64.

Since the front spring part 70a of the spring 70 abuts the bearing plate 47 to be compressed from this state, the inner boss member 62a is slightly pushed back rearward by the compression force, so that the screw thread 62g of the inner boss member 62a is meshed with the screw thread 64a of the screw shaft 64 (the first step).

When the screw shaft 64 is rotated from the first step, the holding member 62 and the cleaning member 61 move rearward along the screw shaft 64 in the state of holding mutual positions (the second step), so that the blade 72 cleans the surface of the glass cover 43.

Figure 16:
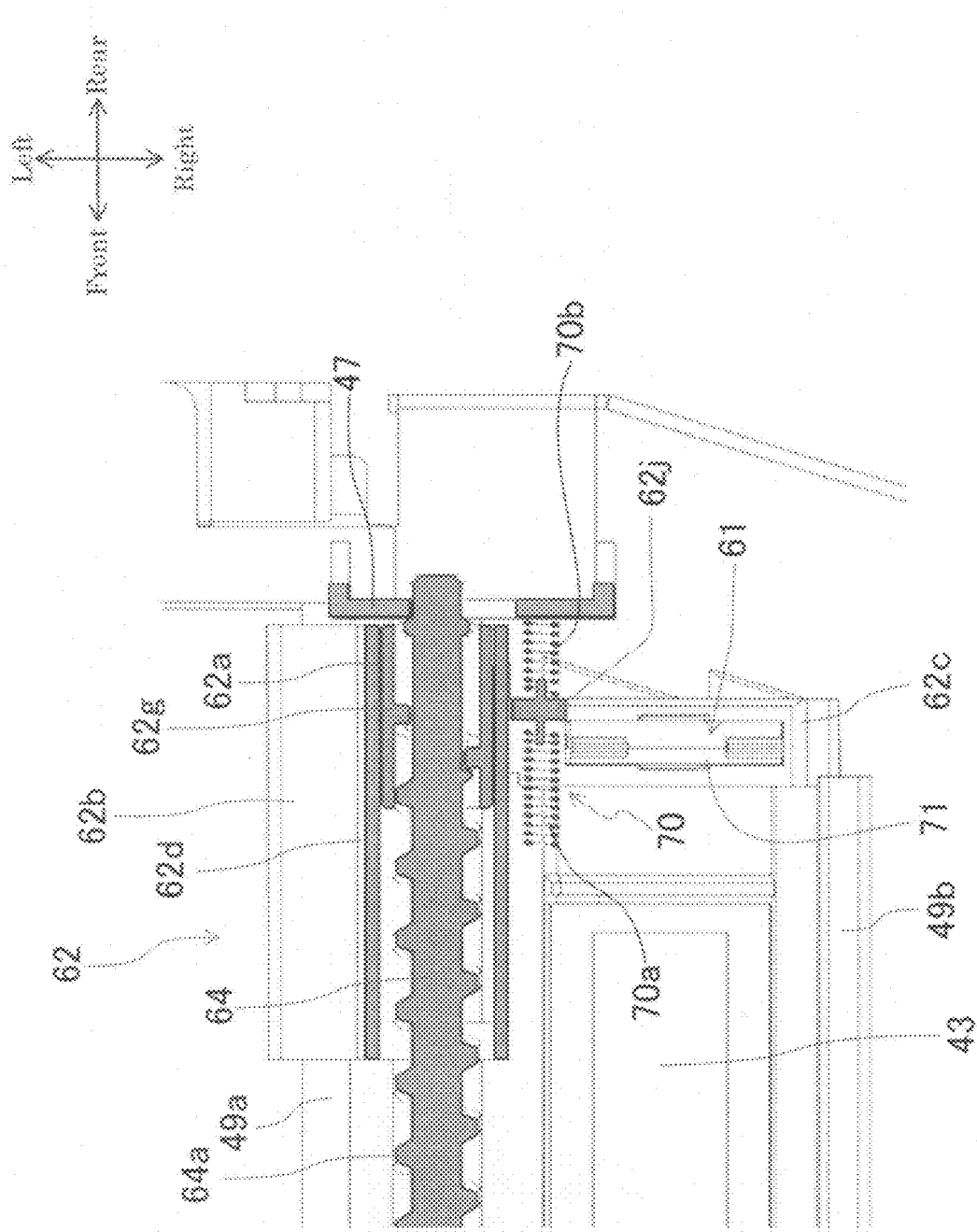
FIG. 16 is a transverse sectional plan view of a holding member in a state in which an inner boss member and an outer boss member abut a rear bearing plate.
Figure 17:
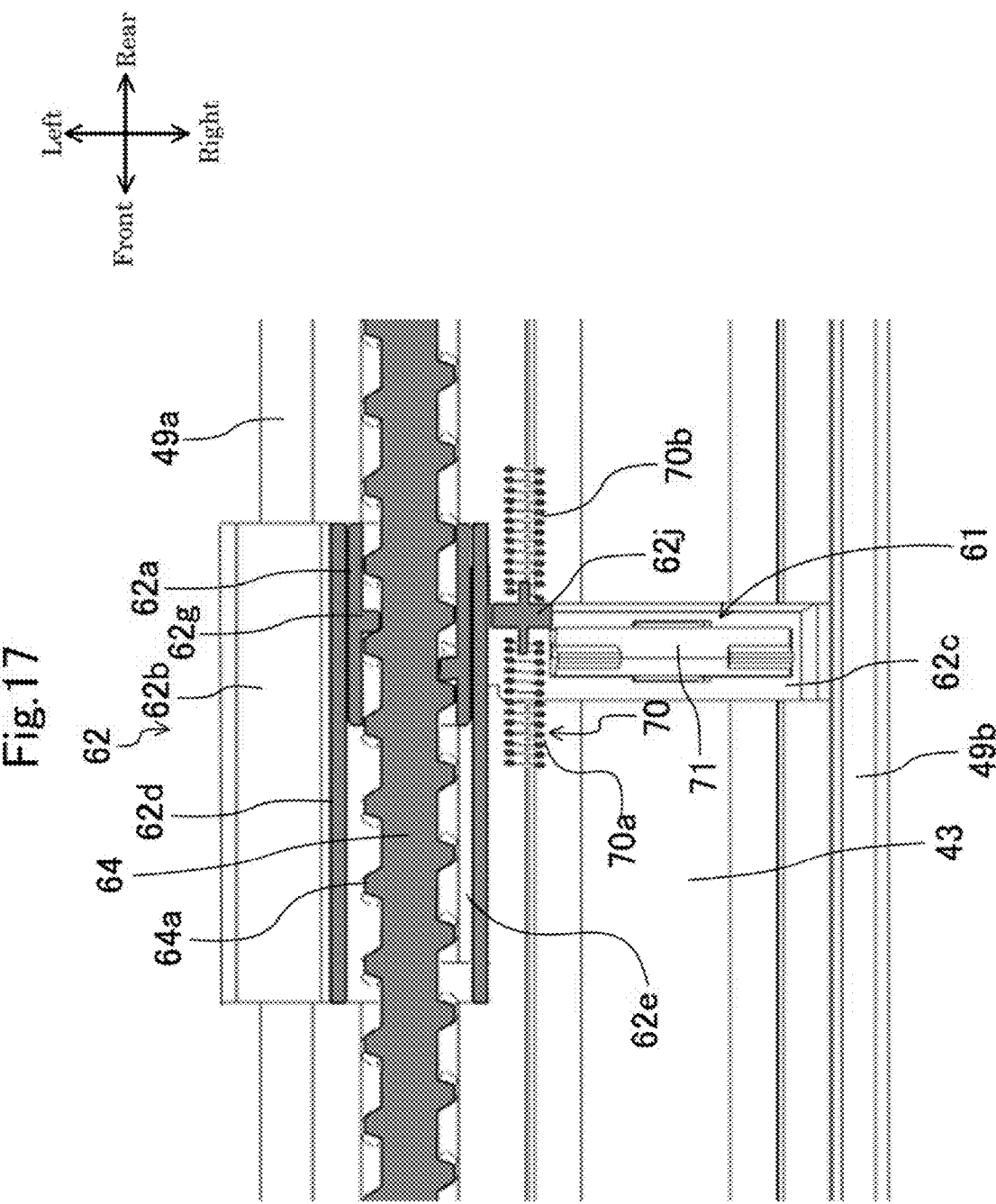
FIG. 17 is a transverse sectional plan view of a holding member which is moving on a reciprocal movement path.

When the outer boss member 62d reaches the rear moving end of the reciprocal movement path A earlier than the inner boss member 62a and abuts the rear bearing plate 47, the outer boss member 62d stops (the third step), but the inner boss member 62a still continuously moves to reach the rear moving end of the reciprocal movement path A later than the outer boss member 62d and stops by abutting the rear bearing plate 47 (FIG. 16). In this case, the screw thread 62g of the inner boss member 62a is detached from the screw thread 64a of the screw shaft 64, but since the rear spring part 70b of the spring 70 abuts the bearing plate 47 to be compressed, the inner boss member 62a is immediately and slightly pushed back frontward by the compression force of the rear spring part 70b, so that the screw thread 62g of the inner boss member 62a is meshed with the screw thread 64a of the screw shaft 64 (the fourth step).

When the screw shaft 64 is rotated backward from the fourth step, the holding member 62 and the cleaning member 61 move frontward along the screw shaft 64 in the state of holding mutual positions (FIG. 17 and the fifth step), so that the blade 72 cleans the surface of the glass cover 43.

Figure 5:
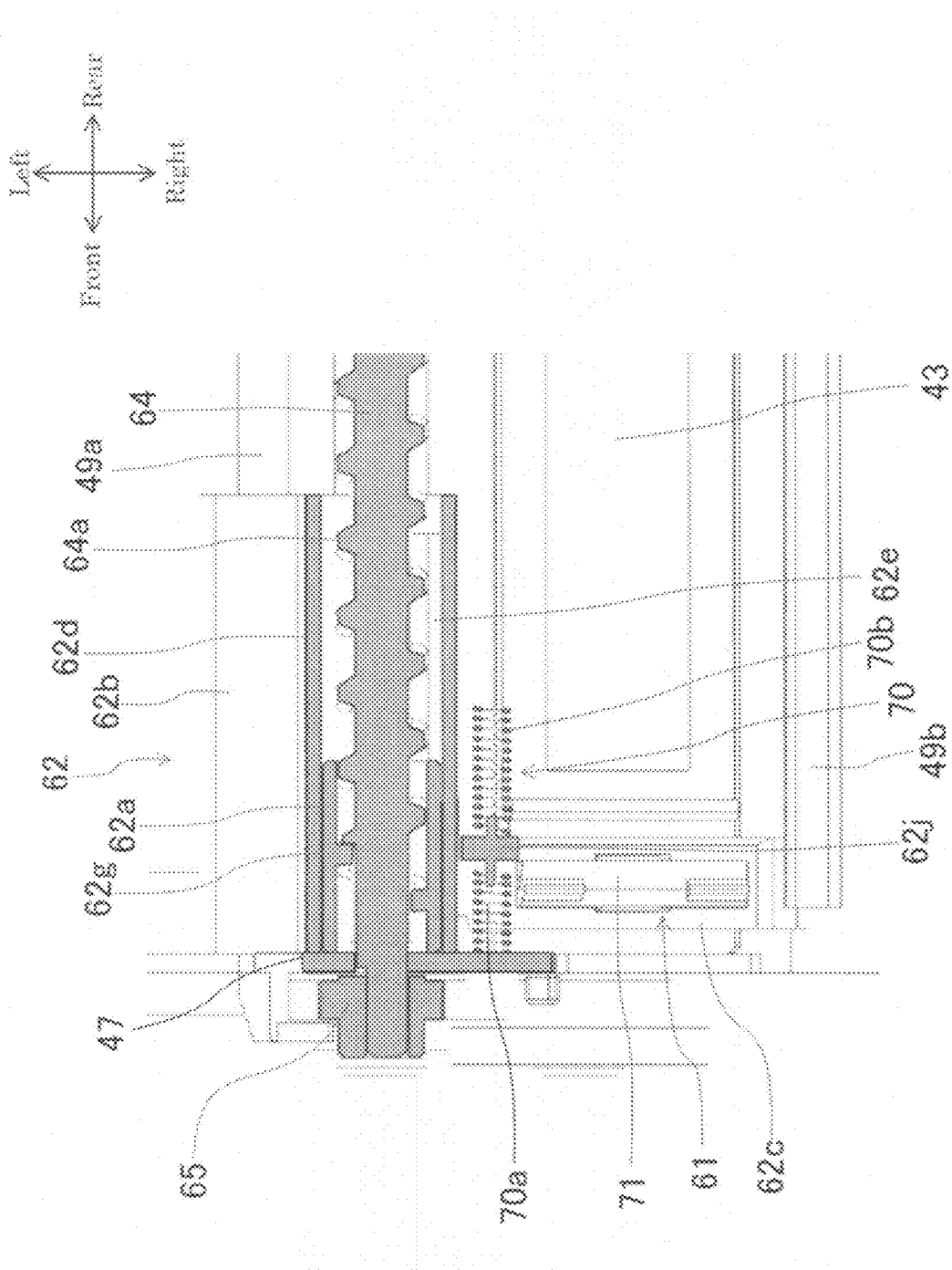
FIG. 5 is a transverse sectional plan view of a holding member in a state in which an inner boss member and an outer boss member abut a front bearing plate.
Figure 6:
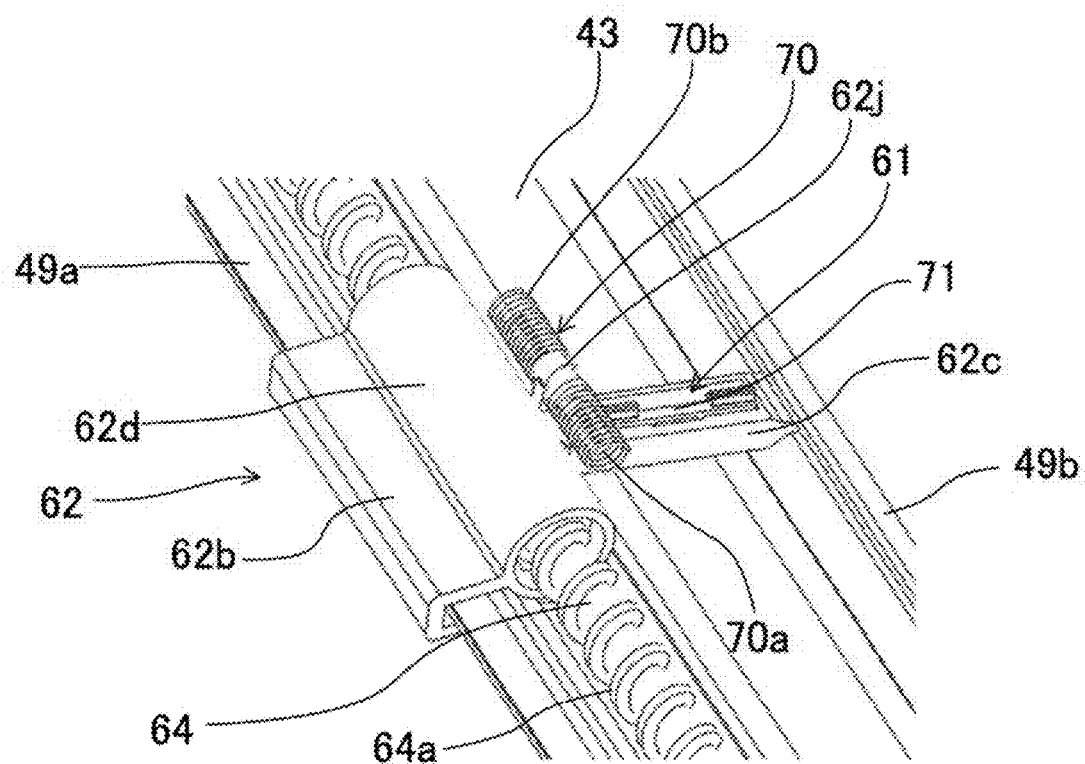
FIG. 6 is a perspective view of a holding member which is moving on a reciprocal movement path.
Figure 7:
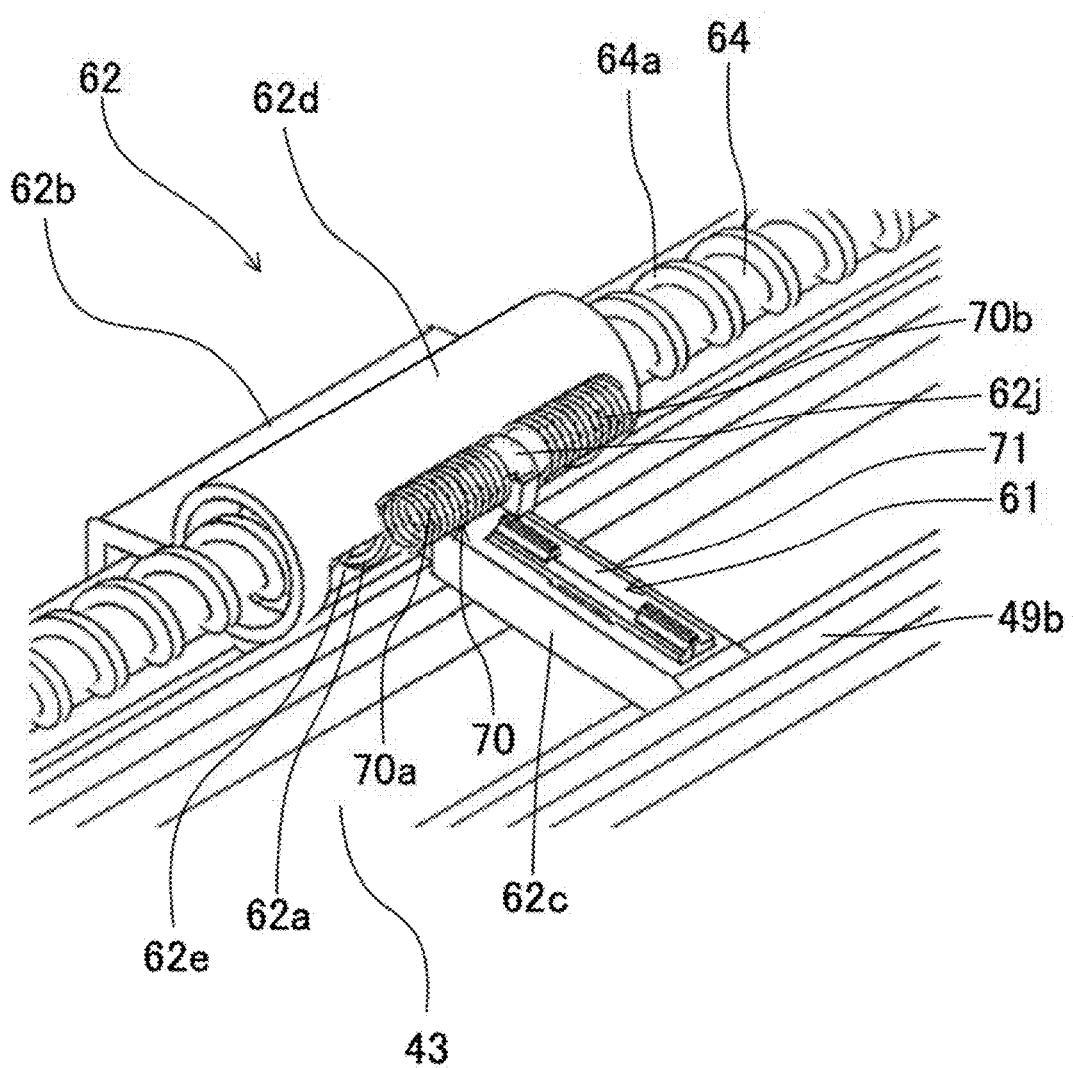
FIG. 7 is a perspective view when
Figure 8:
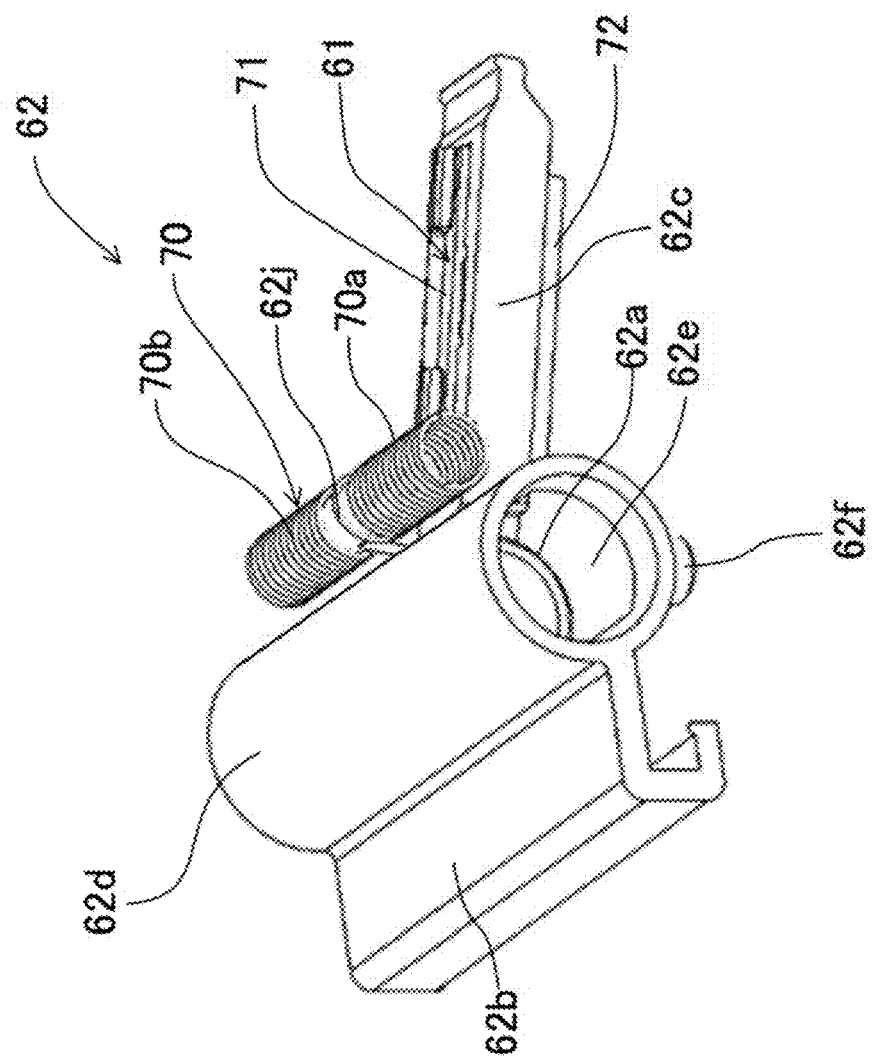
FIG. 8 is a perspective view of a holding member.

When the outer boss member 62d reaches the front moving end of the reciprocal movement path A earlier than the inner boss member 62a and abuts the front bearing plate 47, the outer boss member 62d stops (the sixth step), but the inner boss member 62a still continuously moves to reach the front moving end of the reciprocal movement path A later than the outer boss member 62d and stops by abutting the front bearing plate 47 (FIG. 5 and the seventh step). In this case, the screw thread 62g of the inner boss member 62a is detached from the screw thread 64a of the screw shaft 64, but since the front spring part 70a of the spring 70 abuts the bearing plate 47 to be compressed, the inner boss member 62a is immediately and slightly pushed back rearward by the compression force of the front spring part 70a, so that the screw thread 62g of the inner boss member 62a is meshed with the screw thread 64a of the screw shaft 64 (the first step).

Figure 20:
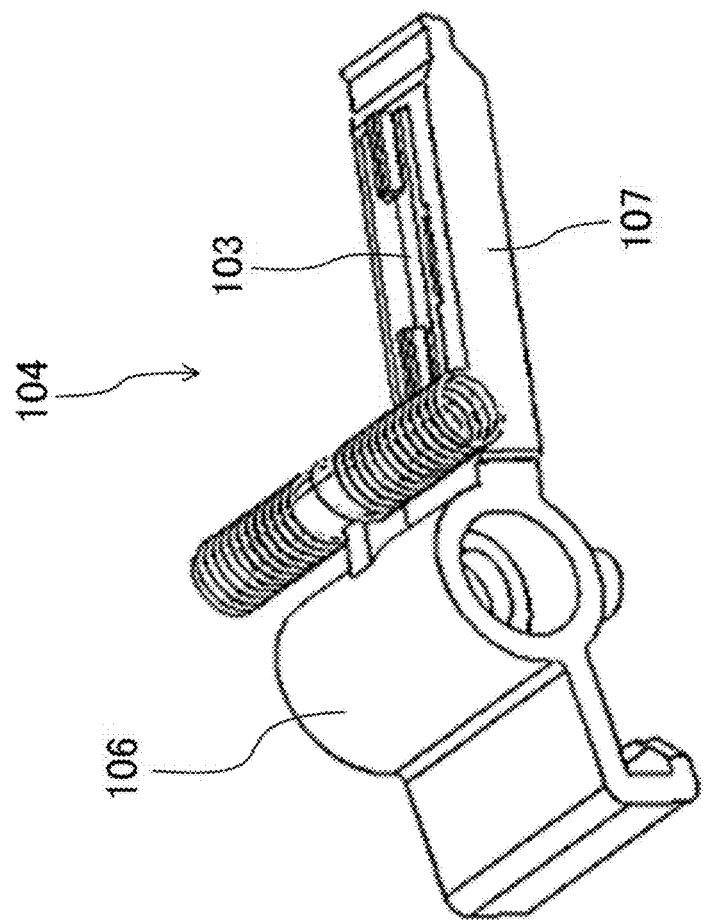
FIG. 20 is a view corresponding to FIG. 8, which illustrates a related art.

However, in the cleaning mechanism 101 in the related art, as illustrated in FIG. 20 to FIG. 22, since the holding member 104 has the cylindrical boss part 106 fitted to the screw shaft 105 and the arm part 107 extending in a direction perpendicular to the screw shaft 105 from the boss part 106 and the cleaning member 103 is held to the arm part 107, the cleaning member 103 may be inclined by frictional resistance due to abutting with the transparent cover 102 at the time of reciprocal movement as illustrated in FIG. 23.

Even though the boss part 106 reaches both ends of the screw shaft 105, if the cleaning member 103 is inclined, an unwiped portion occurs in the transparent cover 102.

In this regard, it is considered that the boss part 106 is lengthened to ensure a stable fitting state with the screw shaft 105. However, as the boss part 106 is simply lengthened, an actual cleaning region is reduced, so that an optical scanning device increases in size in order to sufficiently ensure a cleaning region.

In contrast, in the present embodiment, the holding member 62 has an inside/outside double structure in which the inner boss member 62a is received in the outer boss member 62d and the inner boss member 62a for directly receiving power by externally fitting to the screw shaft 64 has a length similar to that of the boss part 106 in the related art (see FIG. 20 to FIG. 23), but the outer boss member 62d is twice or more as long as the inner boss member 62a. Furthermore, in the state in which the outer boss member 62d stops by abutting the bearing plate 47, since the inner boss member 62a moves in the outer boss member 62d until it abuts the bearing plate 47, it is possible to set the movement range of the cleaning member 61 similarly to the related art without restricting the movement range of the cleaning member 61 to the length of the outer boss member 62d. In addition, since the inner boss member 62a is received in the long outer boss member 62d, the holding member 62 stably moves in the front and rear direction without being inclined, so that cleaning performance is improved. Consequently, it is possible to sufficiently ensure an actual cleaning region without an increase in the size of the optical scanning device 4.

Another Embodiment

Figure 18:
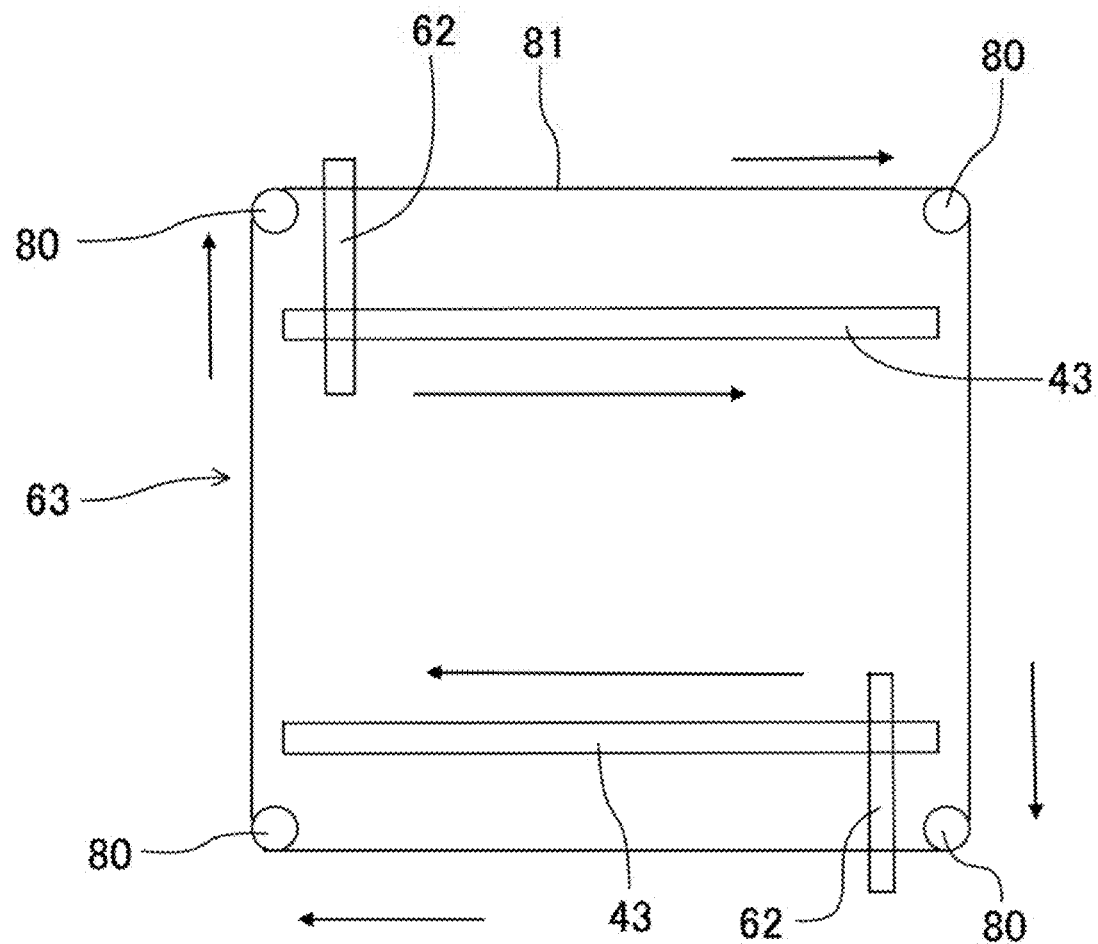
FIG. 18 is a plan view illustrating a cleaning mechanism of another embodiment.

In the aforementioned embodiment, a screw mechanism having the screw shaft 64 is employed as the movement mechanism 63; however, it may be possible to employ the movement mechanism 63 that allows the holding member 62 to reciprocally move along the glass cover 43 by a wire mechanism in the front and rear direction. For example, as illustrated in FIG. 18, a wire 81 is wound around four pulleys 80 in an annular rectangular shape and the holding members 62 are respectively fixed to two side portions of the wire 81, which extend in the front and rear direction, so that the two holding members 62 are mutually moved in a front/back reversed direction.

Modified Example

Figure 19:
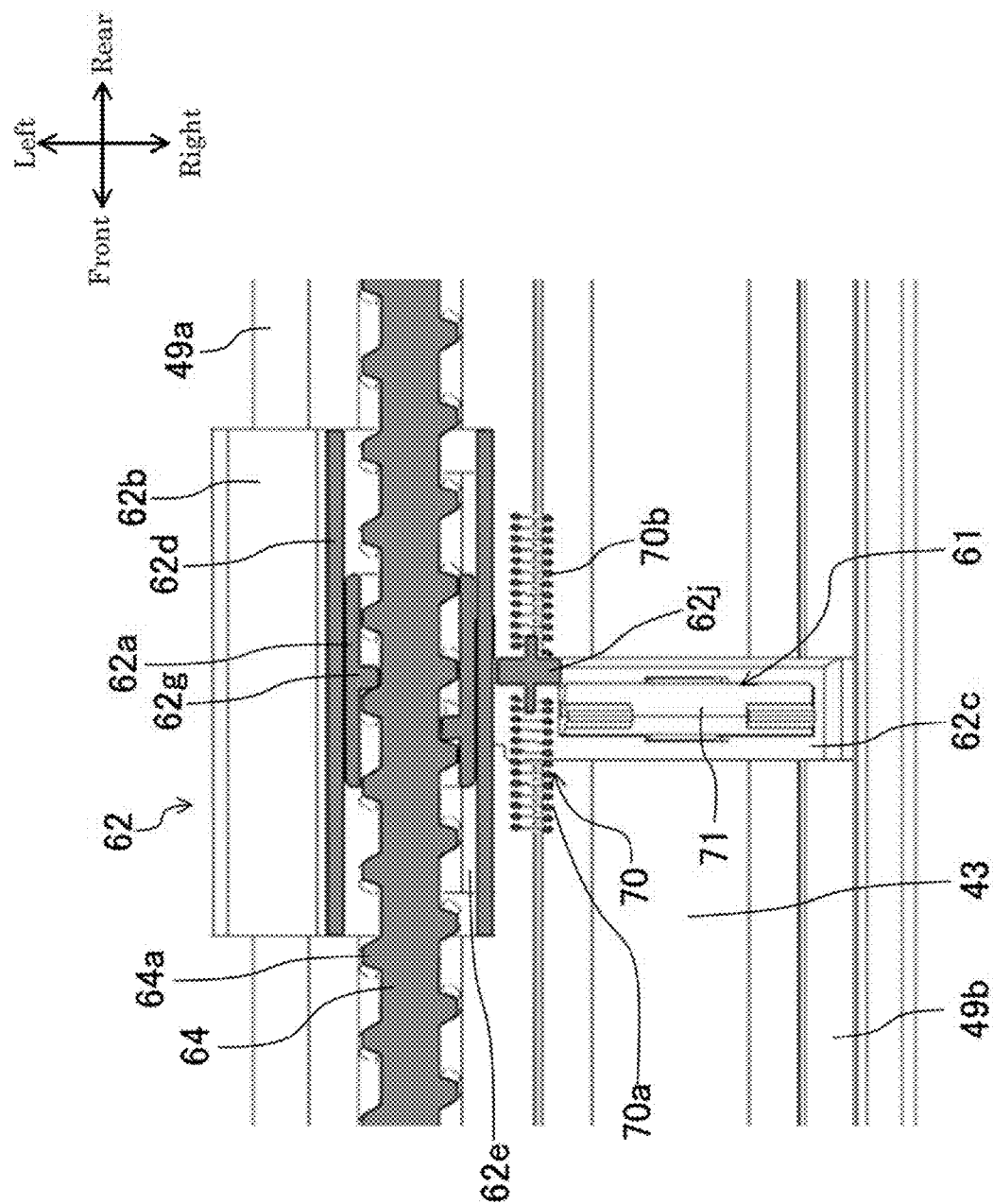
FIG. 19 is a transverse sectional plan view of a holding member of a modification example, which illustrates a positional relation between an inner boss member and an outer boss member.

In the aforementioned embodiment, when the inner boss member 62a and the outer boss member 62d abut the bearing plates 47, the inner boss member 62a is slightly pushed back frontward or rearward by the compression force of the front spring part 70a or the rear spring part 70b, so that the screw thread 62g of the inner boss member 62a is meshed with the screw thread 64a of the screw shaft 64 and then the inner boss member 62a and the outer boss member 62d integrally move. However, after the screw thread 62g of the inner boss member 62a is meshed with the screw thread 64a of the screw shaft 64, the inner boss member 62a may move in a range of a longitudinal length of the opening 62e of the outer boss member 62d as illustrated in FIG. 19.

What is claimed is:
1. An optical scanning device comprising:
 a housing having light emitting ports extending in a predetermined direction;
 a transparent cover that closes the light emitting ports;
 a cleaning member that slidably contacts with a surface of the transparent cover to clean the surface;
 a holding member that holds the cleaning member; and
 a movement mechanism that allows the holding member to reciprocally move along the transparent cover in the predetermined direction,
 wherein the holding member has an inside/outside double structure including an inner boss member that receives power from the movement mechanism and an outer boss member that internally receives the inner boss member and is longer than the inner boss member, and the outer boss member reaches a moving end and stops earlier than the inner boss member, and subsequently the inner boss member moves in the outer boss member, reaches the moving end and stops.

2. A optical scanning device of claim 1, wherein the inner boss member is received in the outer boss member in a light press-fitting state.

3. The optical scanning device of claim 1, wherein the inner boss member is prevented from being rotated with respect to the outer boss member in a circumferential direction.

4. The optical scanning device of claim 1, wherein the movement mechanism includes a screw mechanism or a wire mechanism.

5. An image forming apparatus including the optical scanning device of claim 1.

* * * * *